US011905798B2

(12) United States Patent
Angman

(10) Patent No.: US 11,905,798 B2
(45) Date of Patent: Feb. 20, 2024

(54) POWER-GENERATING APPARATUS FOR DOWNHOLE TUBULARS

(71) Applicant: Per Angman, Calgary (CA)

(72) Inventor: Per Angman, Calgary (CA)

(*) Notice: Subject to any disclaimer, the term of this patent is extended or adjusted under 35 U.S.C. 154(b) by 466 days.

(21) Appl. No.: 16/979,476

(22) PCT Filed: Mar. 11, 2019

(86) PCT No.: PCT/CA2019/050296
§ 371 (c)(1),
(2) Date: Sep. 9, 2020

(87) PCT Pub. No.: WO2019/169510
PCT Pub. Date: Sep. 12, 2019

(65) Prior Publication Data
US 2021/0095546 A1 Apr. 1, 2021

Related U.S. Application Data

(60) Provisional application No. 62/640,971, filed on Mar. 9, 2018.

(51) Int. Cl.
E21B 41/00 (2006.01)
H02K 11/25 (2016.01)
(Continued)

(52) U.S. Cl.
CPC ...... E21B 41/0085 (2013.01); E21B 17/1078 (2013.01); F03B 13/02 (2013.01);
(Continued)

(58) Field of Classification Search
CPC .. E21B 41/0085; E21B 17/1078; E21B 17/10; F03B 13/02; H02K 7/1823; H02K 11/25; H02K 7/1807; F05B 2220/20
See application file for complete search history.

(56) References Cited

U.S. PATENT DOCUMENTS 2,890,019 A 6/1959 Arps
8,931,579 B2 1/2015 Bankston et al.
(Continued)

FOREIGN PATENT DOCUMENTS

CA 2011972 9/1990

OTHER PUBLICATIONS

International Search Report and Written Opinion, PCT/CA2019/050296, dated May 30, 2019, 4 Pages.

Primary Examiner — Brad Harcourt
(74) Attorney, Agent, or Firm — Parlee McLaws LLP

(57) ABSTRACT

A plurality of energy-generator pods, and methods of use, are provided along a rotatable tubular string extending downhole from surface into a wellbore. In embodiments, rotation of the tubular acts as a rotor of the pod and an outer component about the tubular, capable of relative rotation thereabout, forms the stator. The pod can also be equipped with bi-directional wireless electronic data communication including communication uphole to surface from sensors downhole, pod-to-pod, and down-hole communication to downhole tools. Pods can be fit to centralizers already employed for rotary tubular strings, the centralizer portion engaging the wellbore and remaining stationary relative to the rotating centralized tubular.

19 Claims, 12 Drawing Sheets

(51) Int. Cl.
*E21B 17/10* (2006.01)
*F03B 13/02* (2006.01)
*H02K 7/18* (2006.01)

(52) U.S. Cl.
CPC ........... *H02K 7/1823* (2013.01); *H02K 11/25* (2016.01); *F05B 2220/20* (2013.01)

(56) References Cited

U.S. PATENT DOCUMENTS

| | | | | |
|---|---|---|---|---|
| 2002/0062992 | A1* | 5/2002 | Fredericks | G01V 1/52 324/369 |
| 2007/0079989 | A1* | 4/2007 | Bankston | E21B 41/0085 175/325.1 |
| 2007/0194948 | A1* | 8/2007 | Hall | E21B 17/003 340/854.8 |
| 2010/0133833 | A1 | 6/2010 | Williams | |
| 2013/0026766 | A1* | 1/2013 | Ocalan | H02K 7/1853 290/1 R |
| 2015/0034294 | A1* | 2/2015 | Miles | E21B 47/13 166/66.5 |
| 2015/0090444 | A1* | 4/2015 | Partouche | E21B 41/0085 166/254.2 |
| 2016/0251898 | A1* | 9/2016 | Angman | E21B 17/1078 175/57 |
| 2017/0051579 | A1* | 2/2017 | Hay | E21B 10/08 |
| 2017/0370202 | A1* | 12/2017 | Tegeler | E21B 41/0085 |

\* cited by examiner

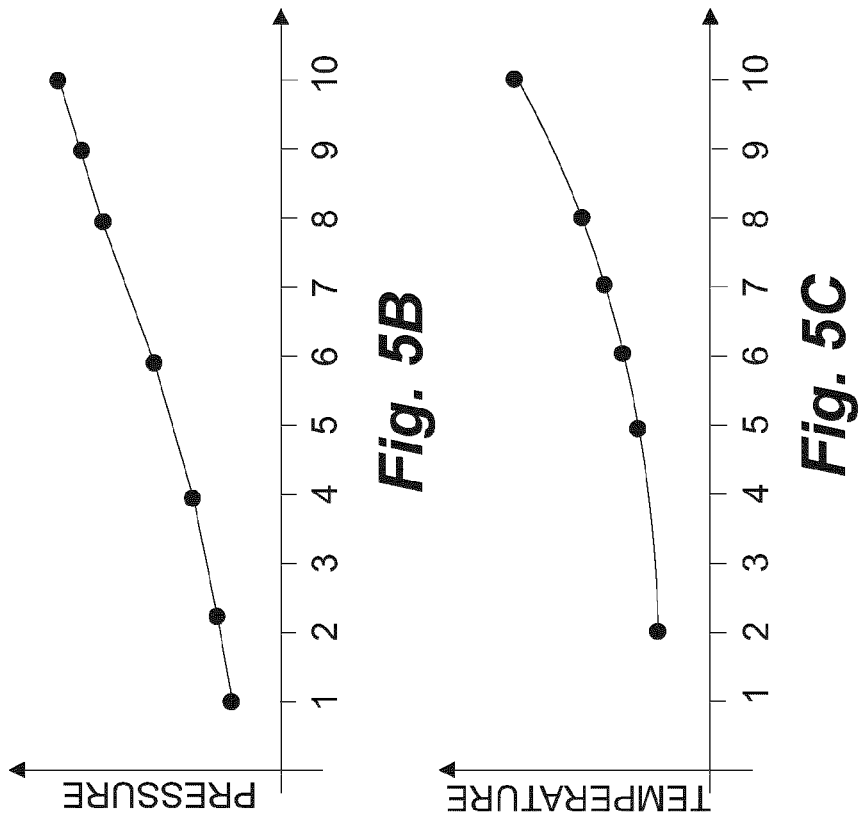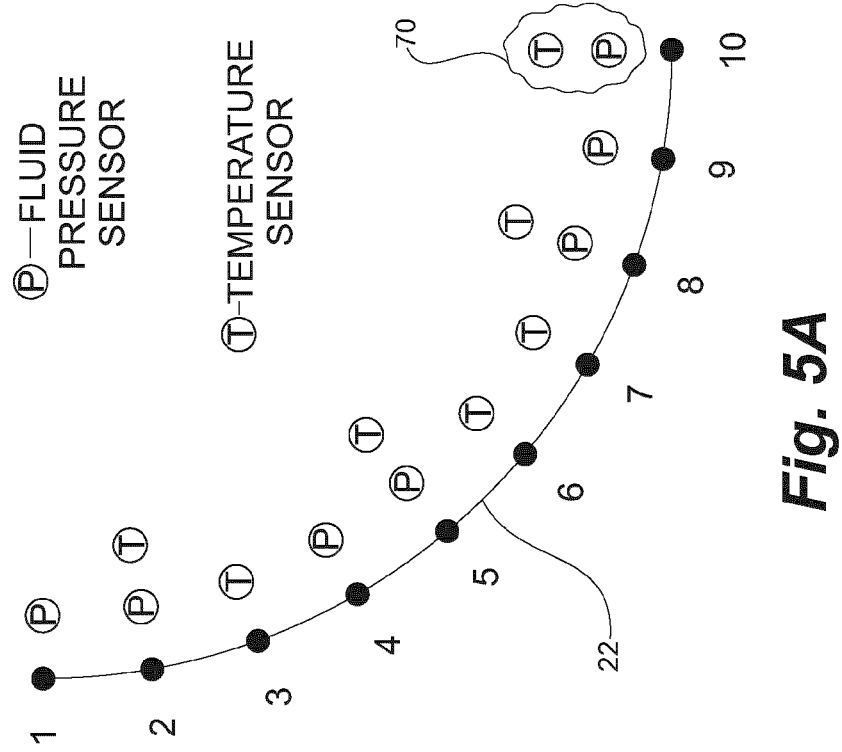

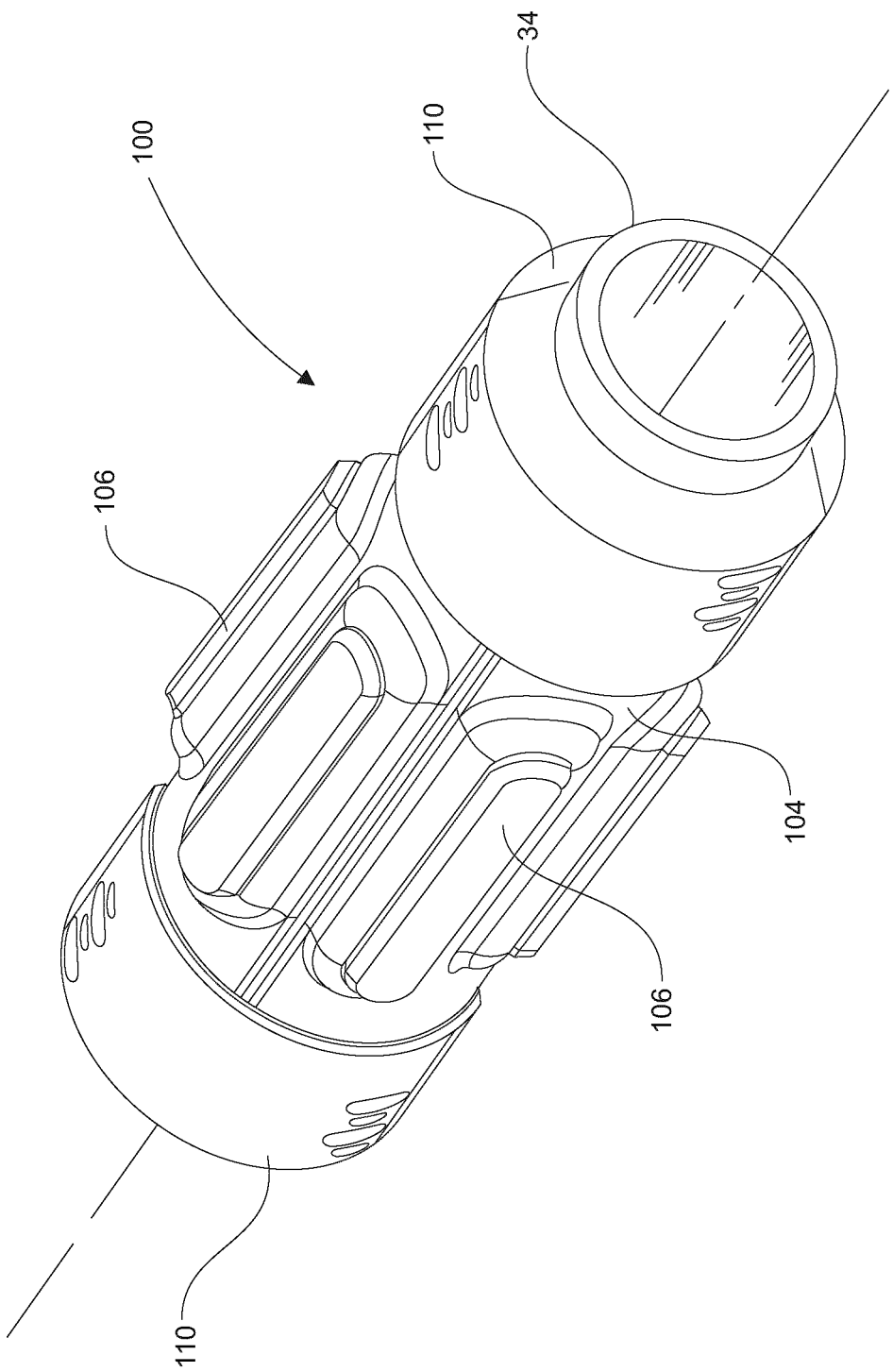

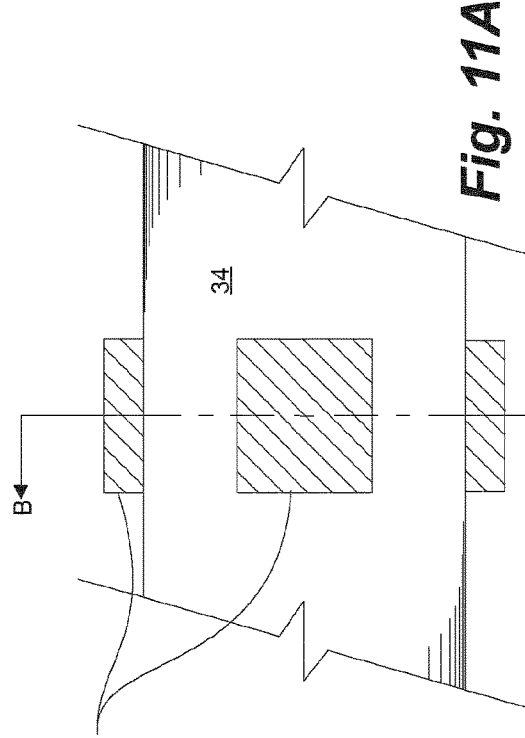
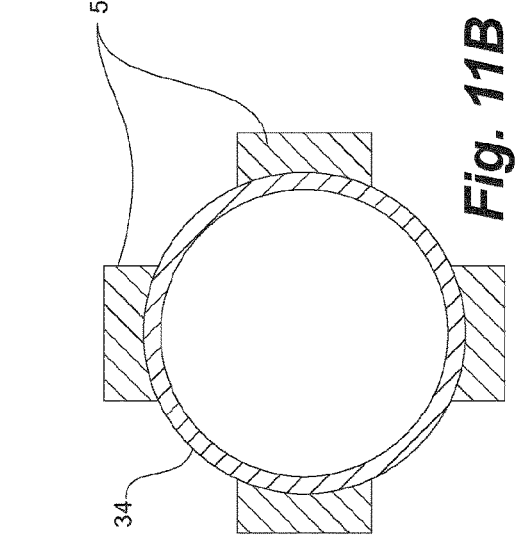
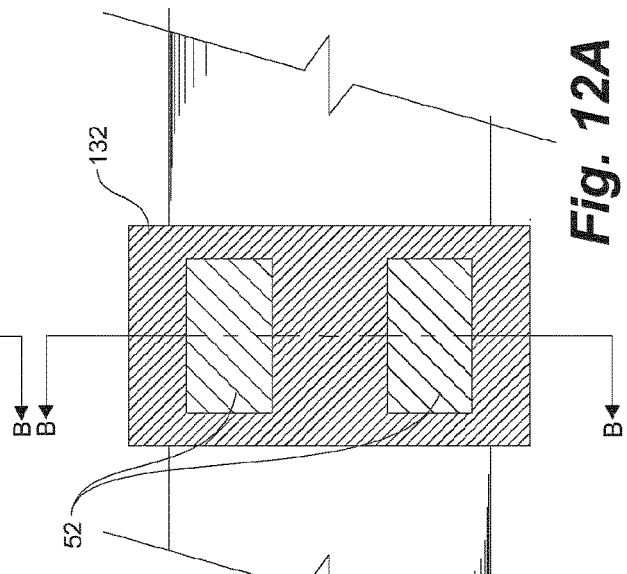
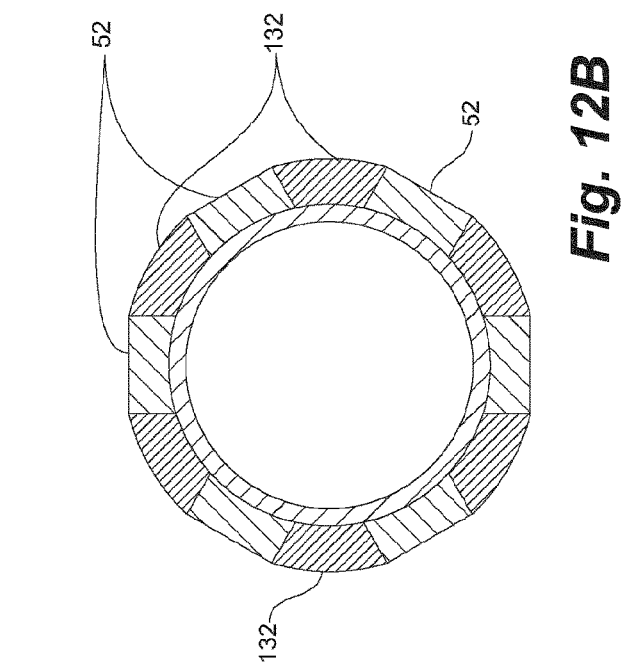

POWER-GENERATING APPARATUS FOR DOWNHOLE TUBULARS

CROSS-REFERENCE TO RELATED APPLICATIONS

This application claims the benefit of U.S. provisional patent application 62/640,971, filed Mar. 9, 2018, the content of which is incorporated herein by reference in its entirety.

FIELD

Embodiments disclosed herein relate to wellbore drilling apparatus for generating power at locations along the apparatus for localized consumption, and more particularly to apparatus and systems capable of both centralizing rotating tubulars in the wellbore whilst generating power for sensors and data transmission.

BACKGROUND

Obtaining downhole measurements generally instructs the operator about the conditions at the downhole location, and in dynamic operations, aids the operator in monitoring performance and wellbore status. In drilling operations, using real-time measurements enables real-time adjustment of drilling parameters.

In coiled tubing drilling, using mud motors for enabling directional drilling, the coiled tubing does not rotate and can be equipped with substantially continuous electrical communication paths. However, for drilling systems using jointed tubing, such as rotary steerable systems, directional control is maintained in real time and communication of real time data has been maintained by mud pulses. Rotation of the string of tubing from surface to the drill bit introduces challenges to data communication methods. Rotary steering has been applied more and more over mud motor operations as the resulting wellbore can be less tortuous and the duration between tripping out and running back into the wellbore is reduced. Rotating tubular strings, particularly for extending and deviated wells, are equipped with centralizers for mitigating wear to the wellbore and the tubulars.

Tools for measurement of downhole parameters, including logging-while-drilling and measurement-while-drilling apparatus, are available but remain challenging for reasons including achieving useful data transmission speeds. With ongoing challenges with wireless and wired data transmission, mud-pulse has still been the most common way of getting data from downhole tools to surface, however it is very slow, at approximately single digit bits per second. Further, mud pulse communication requires the fluid circulation system to be established, delaying system integrity and testing sometimes until already at depth and beginning drilling operations. Higher speed electronic transmission has been limited to expensive wired and troublesome wireless means. For wireless transmission, the power demands of multiple transmission repeaters has resulted in the use of a corresponding multiplicity of power sources, namely batteries, which are expensive, and have a limited power cycle. Further, replacement of power supplies is time-consuming and expensive.

Proposals to increase data transmission rate include methods and apparatus as disclosed in EP 2157278, in which acoustic repeaters are disposed along the tubulars for short hop transmission using low power, high frequency signals (1 to 10 kHz) for receipt at a hub closer to surface for ultimate conversion to a low frequency electromagnetic wave signal (at 1 Hz) and forwarding transmission through-the-earth (typically at frequencies of less than 3000 Hz) to surface. In offshore applications, it is suggested that wired or optical communication is used from the rig floor at the sea surface to the seabed, and low frequency electromagnetic signals from the seabed to the downhole tool hub and higher frequency acoustic repeaters therebelow.

Downhole telemetry systems have been known for some time including wired or optical transmission of data measurements including transmission of data from the bottom of a downhole assembly uphole to a drilling rig at surface. Electronic communication along tubular is difficult. As conventional pipe is assembled in a string of discontinuous or jointed lengths at threaded tool joints, it is very difficult to reliably establish and maintain electrical continuity thereacross. There are a variety of exotic drill pipe options (sometimes referred to as "intelli-pipe"), having wire installed therealong incorporating techniques for electrically coupling the wiring sections together. Such pipe sections are very expensive and fragile at the wire to wire connections.

In U.S. Pat. No. 9,631,485 to Keller et al., a hybrid electric-acoustic transmission of data is taught to overcome the complexity of communications along tubulars. Keller notes that National Oilwell Varco® promote an EM telemetry identified as an IntelliServ® system. The system uses induction coils provided and precisely located in the box and pin ends of the tubular joints to ensure reliable data transfer. Keller recognized that for a long (e.g., 20,000 foot) well, there can be more than 600 tool joints, representing over 600 pipe sections to be threadedly connected and tested at surface. Further, Keller notes that in practice, the IntelliServ® system generally requires the use of booster assemblies along the tubular drill string including three to six foot sub joints located along the drill pipe about every 1,500 feet adding to the system expense. Identified in Keller, U.S. Pat. No. 8,242,928 to Prammer, entitled "Reliable Downhole Data Transmission System" discloses a further EM telemetry system using radiofrequency signals. In Prammer, electrodes are placed in the pin and box ends of pipe joints and tuned to receive RF signals that are transmitted along the pipe joints having a conductor material placed there along, with the conductor material being protected by a special insulative coating.

Wireless electronic communication at high data rates has been attempted to bridge or hop over jointed tubing interfaces. Wireless communication signals at high electromagnetic, radio frequencies (RF) has been used, powered by batteries. However, batteries are a serious limitation, including having limited storage and operational life both before running downhole and whilst downhole and during drilling. Operational life is adversely affected by higher signal power desirable in poor transmission environments.

Many closely-spaced wireless communication links or repeaters provide a continuous communication path from deep in the wellbore up to surface. Each electronic link requires a power source. The use of batteries as the power source is a service challenge due to the large number of batteries that have to be changed frequently, with the power cycle to discharge being measured in hours not days or weeks. As jointed tubing is often racked in 90 foot triple stands, each stand being three 30 foot joints of drill pipe, personnel access to each joint for battery replacement is usually to top or bottom ends of the stands, limiting maintenance. Further, even one defective or exhausted battery along several kilometers of tubular string interrupts the communication path and requires tripping out of the entire string.

There is an ongoing desire for obviating limitations associated with expensive and specific tubular modification for implementing electrical options for downhole data communication. Such solutions would not be subject to the expense of added hardware, the fragility of wired pipe, nor be subject to the difficulties associated with discharge-only battery-powered solutions.

SUMMARY

Generally, for increasing data transmission capabilities and increasing data throughput without reliance upon environment and time-limited battery sources, a plurality of downhole electrical generator and data transmission pods are provided that utilize relative rotation between a rotating tubular string and the wellbore. Each pod produces energy for one or more associated electrical devices including sensors, microprocessors and radio frequency RF data communication modules for bidirectional communication between like pods. Communications are available at any point of operation as long as the tubular is being rotated, or before off-line or buffered electrical energy is depleted during stopped rotation, including while the tubulars are in transit.

Short-range communication systems, such as near-field communications are in the MHz range and Bluetooth™, wireless local area network and Wi-Fi networks typically use at least the ultra high-frequency bands in the 2.4 GHz and higher ranges. The pod's data communication unit provides short hop intercommunication between adjacent, or non-adjacent pods. System economics can be managed by optimizing transmission range for minimizing the number of pods required along the tubular string. Generation of onboard power and optional buffering using energy storage devices, removes battery-only limitations on signal strength. More powerful signal strengths can now be provided, suitable for the signal-interfering environment of the wellbore. Transmission range is managed to ensure transmission integrity is maintained.

Each pod can comprise data transmission and receiving electronics and micro-controller and memory modules for data processing if any. Depending on the communication protocol, each pod can manage pod identity, and wireless electronic data transmission and reception handshaking and other protocols for maintaining data integrity and identification through a multiplicity of repeated transmission hops. Further, possibility for pod failure can be managed by providing pod spacing redundancy and electronic reallocation of an adjacent pod within transmission range for communication to bypass the failed pod.

Pods are incorporated as a series of repeaters spaced along the tubular string. In embodiments, the pods are incorporated in drill pipe centralizers, particularly convenient and required in long reach rotating tubular strings for wellbores having a highly deviated and horizontal reach portion. A pod may be incorporated at each joint, or each centralizer, or alternating with joints free of any pod or centralizer, or mingled with generic non-powered centralizers.

Each pod incorporates relatively rotating components, comprising an outer component and an inner component that rotate relative to the outer component. The relative rotation of the inner and outer components drive the electrical energy generator portion. In a centralizer embodiment, the outer component engages the wellbore in a frictionally-engaging, non-rotating mode, and the inner component that rotates with the tubular string. The inner component relates to the tubular being radially inward of the non-rotating components and, as illustrated in embodiments, does not restrict the relative radial location of the energy-generating portions of the generator.

The entire pod, or simply the outer component thereof, subject to wear and damage, can be replaceable in subsequent run in or operations.

The generator portion can directly power its respective pod and devices borne by the pod, or carried on the tubular string, and can further implement an intermediate electrical energy buffer such as a rechargeable battery or a capacitor for providing energy during period slow or zero rotational speed when insufficient energy is being generated.

During drilling, pods can be incorporated into custom joints of drill pipe, or can be retrofit to one or more joints of conventional tubular string. During operations, the pods can be pre-fit to joints or installed while running into the wellbore.

The pods can be connected to or fit with sensors, such as pressure or temperature transducers, for monitoring downhole parameters representing downhole conditions while drilling.

In one broad aspect, an energy generator is provided for rotatable tubulars extending downhole along a wellbore. A first energizing portion is drivably rotatable by rotation of the tubular; and a second energizing portion is supported concentrically about the first energizing portion and rotatable relative thereto, wherein when the tubular rotates the first energizing portion rotates relative to the second energizing portion, electrical current is generated from one of the first or second energizing portions. In embodiments, one of the first or second energizing portions is a magnet, such as a permanent magnet, for producing a magnetic field, and the other of the second and first energizing portion comprises an electrical coil. Relative movement of the coil and magnetic field induces current therein.

In other embodiments, each generator is also fit with a wireless data transmitter for communication of data signals between generators. In embodiment in which the rotatable tubular comprises a string of rotating tubulars, at least one tubular is an energy-generating tubular comprising a rotor having an axis and a stator concentric thereto and rotatable about the rotor's axis; and for each generating tubular, the rotor comprises the first or second energizing portion and the stator comprises the other of the second and first energizing portions.

In another aspect, a system for wireless communication along a tubular string of tubulars between surface and downhole locations is provided comprising a plurality of the energy generators described above and distributed along the tubular string; and a radio frequency wireless data communication module having a transmitter and receiver, at each generator, the communication module powered by its respective generator, wherein, as the tubular string rotates, each communication module communicates with a like communication module within a wireless range.

In another aspect, a method of drilling a wellbore from surface is provided comprising: rotating a string of tubulars extending from surface to a drill bit at a distal location downhole, collecting downhole data at one or more data collection locations along the tubular string; generating power at each of the one or more data collection locations for processing the collected data; and wirelessly transmitting the collected data from one data collection location to an adjacent data collection location to surface.

In embodiments, the method further comprises modifying a tubular for each data collection location by affixing one or magnets circumferentially about the tubular to form a generator rotor about the tubular; and fitting a generator stator concentrically about the rotor for forming an generator-equipped tubular; and energizing a wireless transmitter and receiver by the generated power for wirelessly transmitting the collected data from each of the data collection locations.

BRIEF DESCRIPTION OF THE DRAWINGS

FIGS. 5A, 5B and 5C illustrate arrangements of pods and data sensors along a tubular string including a schematic of the tubular string with indicated pressure and temperatures sensors, a graph of pressures measured at each sensor-equipped pod, and a graph of temperatures measured at each sensor-equipped pod respectively, the data received at surface using a short hop data communications system;

FIG. 7A is a perspective view of a centralizer having end collars fixed to the tubular and a rotatable sleeve portion having protuberances for engaging the wellbore;

FIG. 10A illustrates one or more coils, of narrow radial extent located in the sleeve ends under the axially restraining collars affixed to the rotatable tubular, the magnets being located in the co-rotating collars for axial alignment with the sleeve's coils, FIG. 10B illustrates one or more coils of more substantial radial extent, than that of FIG. 10A, the coils being located in the greater bulk of the inner sleeve, the magnets being affixed to the tubular for axial alignment with the sleeve's coils, and FIG. 10C illustrates one or more coils, of narrow radial extent located in the axially-restraining collars affixed to the rotatable tubular, the magnets being located in the non-rotating inner sleeve for axial alignment with the collars coils;

FIGS. 11A and 11B are side and cross-sectional end views respectively of a tubular illustrating one four-magnet configuration of individual magnets secured thereto; and FIGS. 12A and 12B are side and cross-sectional end views respectively of a tubular illustrating a six-magnet configuration of individual magnets secured thereto in a strip of alternating magnetic and non-magnetic materials.

DETAILED DESCRIPTION OF THE PREFERRED EMBODIMENTS

Figure 1:
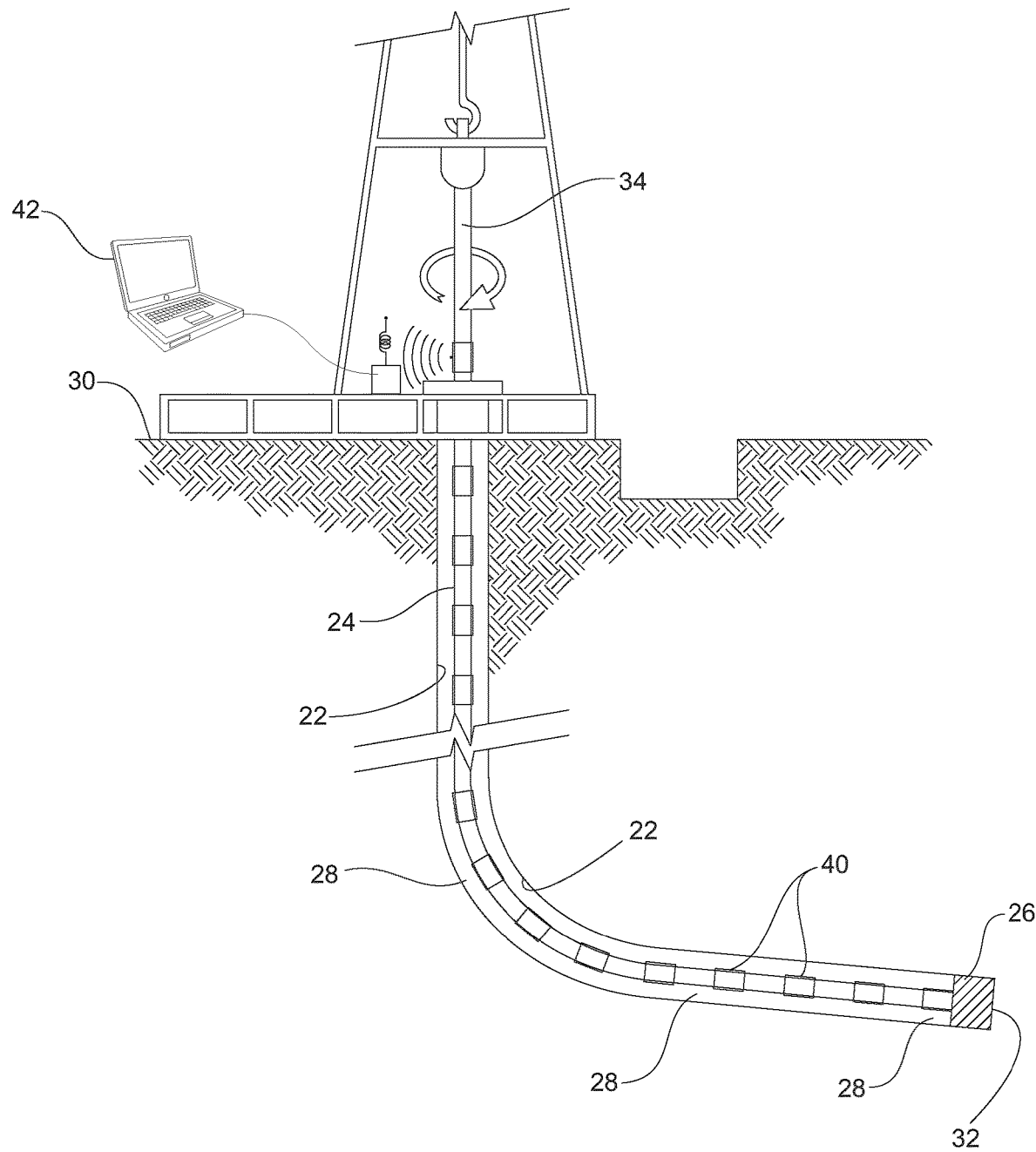
FIG. 1 is a side view of a deviated wellbore, a rotary tubular string extending downhole form a rig at surface, and energy-generating pods distributed along the tubular string.

With reference to FIG. 1, a wellbore 22 is traversed using a tubular string 24 extending downhole between surface 30 and one or more a downhole data collection locations 28,28. The tubular string 24 is rotatable. A system is provided comprising a multiplicity of short hop data communication pods distributed along the tubular string 24 and supported on spaced tubulars 34 for generating energy during tubular rotation for powering one or more devices including sensors, microprocessors, and data communication equipment. Each pod 40 collects data and transmits said data from one or more of the downhole data collection locations 28 to a receiver or data terminal 42 at surface 30.

In an embodiment, the tubular string 24 is a drill string having a drill bit 26 rotated at a bottom 32 of the wellbore, the drill bit 26 being located at a distal end of the rotating tubular string 24. The tubular string 24 is made up of one or more connected sections of discrete tubulars 34, 34 . . . . Tubulars 34 may be fit with a pod 40, the pod 40 comprising an electrical generator, and may also comprise components for power conditioning and storage, data communication modules and sensors. It is desirable in downhole systems to collect data from various sensors or other equipment and communicating said data to the surface 30 from downhole locations 28 including adjacent the bottom 32 of the wellbore 22, the drill bit 26 and along the tubular string 24. This information may include fluid pressure and temperature.

A concatenation of generator-equipped tubulars 34,34 . . . of the string 24 are tubulars that are fit with pods 40,40. The spacing and number of pods 40 is dictated by the range of data communication along the tubular string 24.

Generator Pods

Figure 2A:
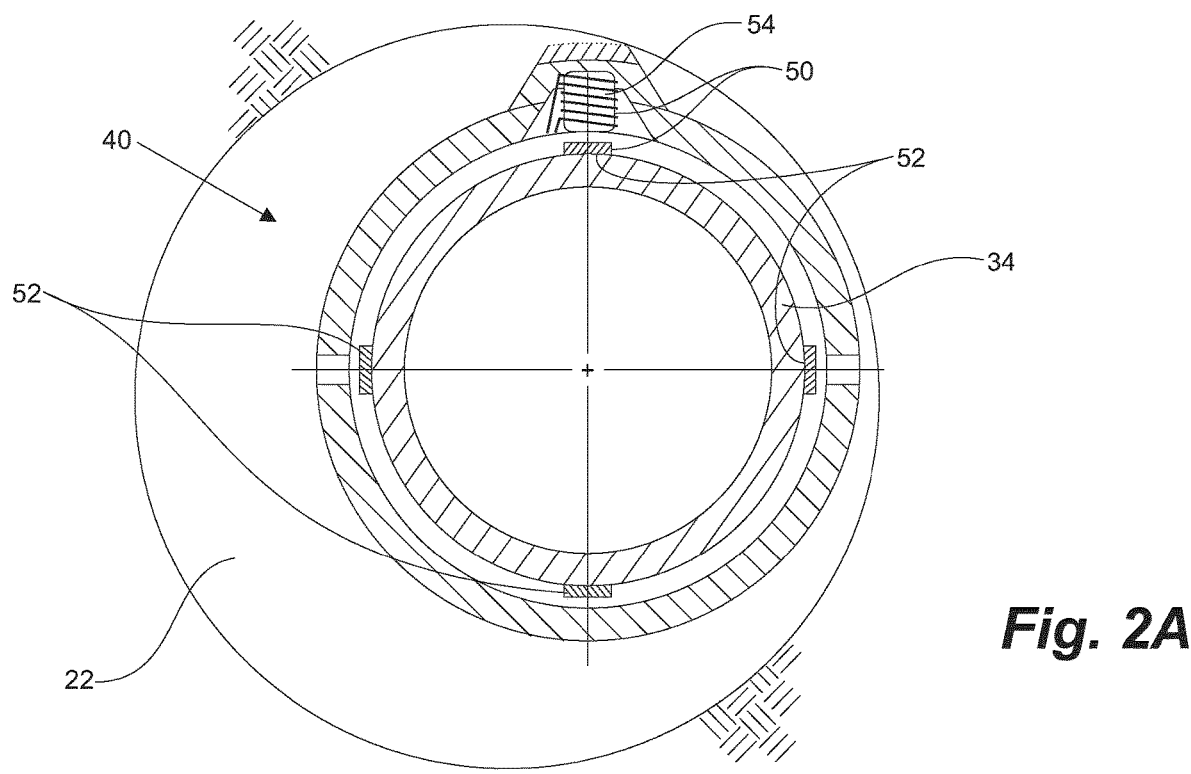
FIG. 2A is a cross-sectional view of the tubular string and through a pod, the pod having at least one protuberance for engaging the wellbore, the pod having at least one coil and one or more permanent magnets coupled to the tubular for rotation past the coil.
Figure 2B:
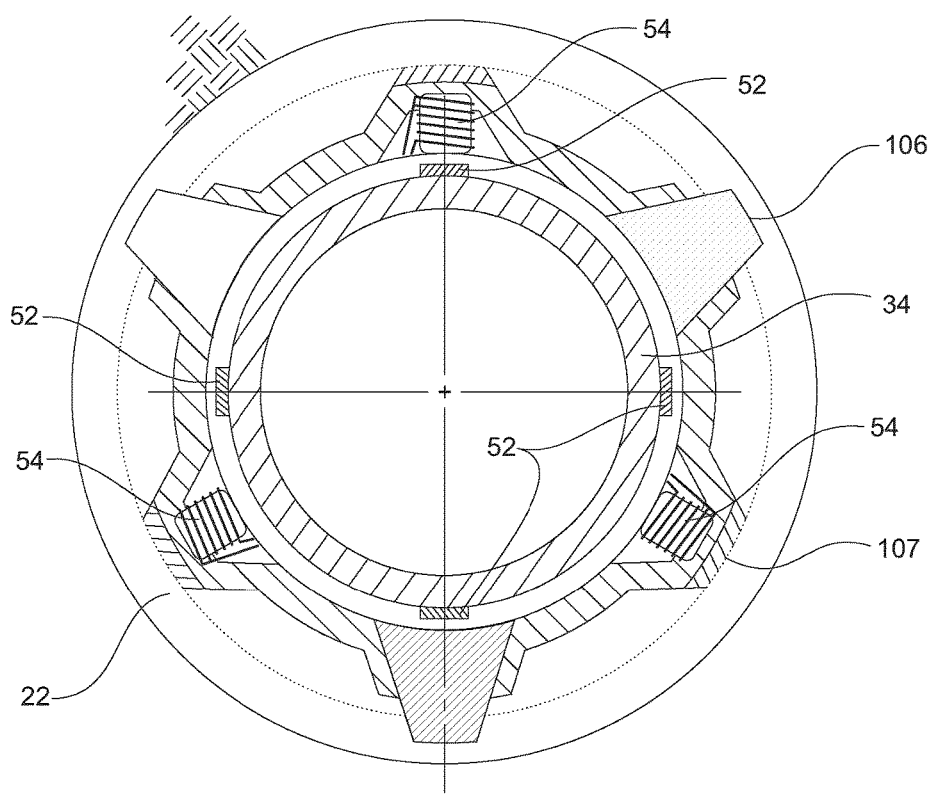
FIG. 2B is a cross-sectional view of the tubular string and through an alternate embodiment of a pod, the illustrated pod having multiple protuberances about the pod's circumference for centralizing the tubular string in the wellbore, the pod having three coils shown and four permanent magnets distributed about tubular for rotation past the coil.
Figure 3:
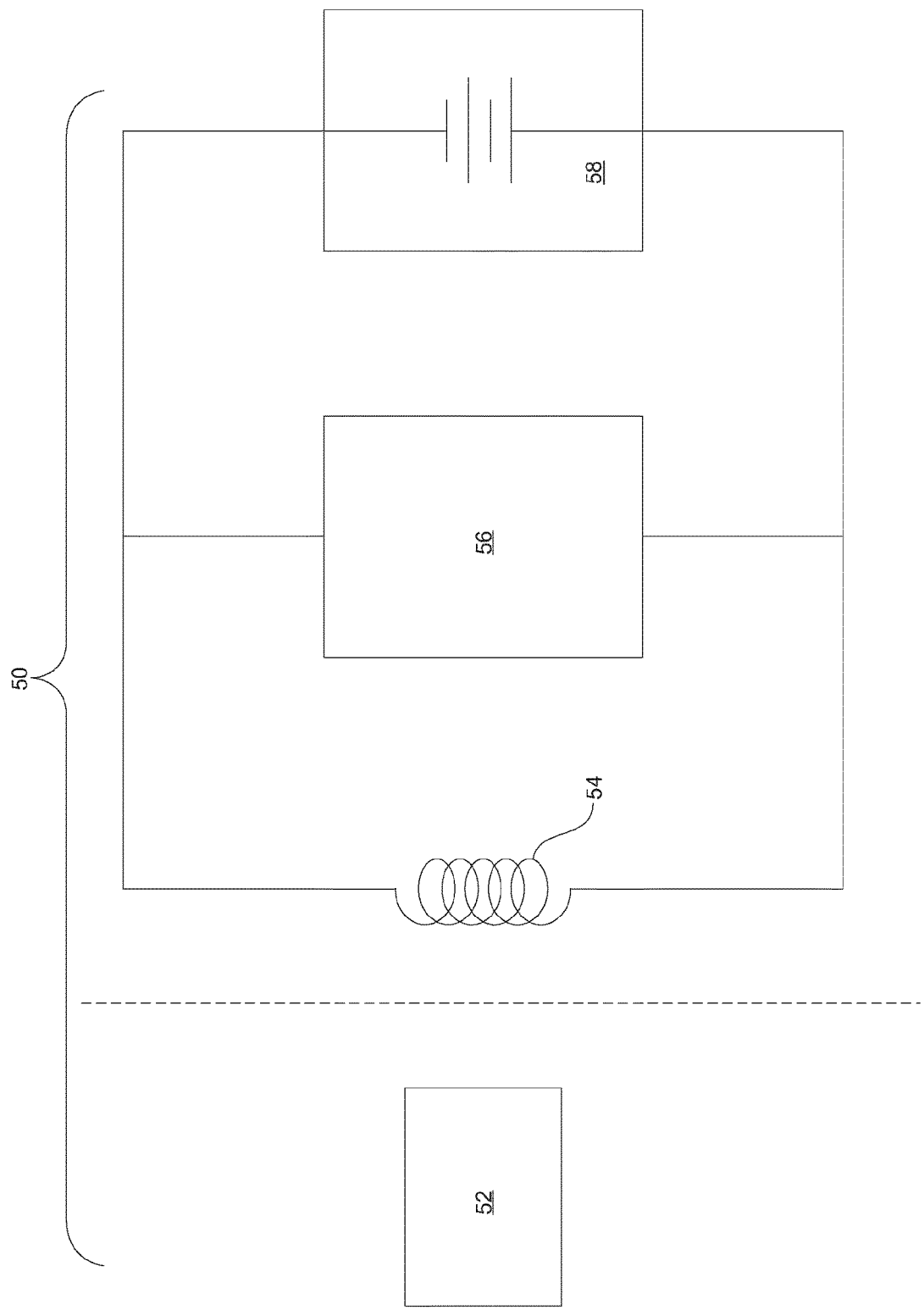
FIG. 3 is one simplified electrical schematic diagram of a generator circuit for a pod including the magnet, coil, power conditioning components and optional power storage components.

Referring to FIGS. 2A, 2B and 3, each pod 40 comprises a generator 50. The tubular 34 is fit with a first generator component 52,54 rotatable with the rotatable tubular 34. The pod 40 forms a housing structure is fit about the first generator component having a second generator component 54,52, in addition to power conditioning components 56 and power storage components 58, all stationary within the pod 40. In the string 24 of rotating tubulars 34,34 . . . , at least one tubular 34 is fit with a pod 40 for forming an energy-generating tubular comprising a rotor having an axis and a stator concentric thereto and rotatable about the rotor's axis.

In the generator 50, the first generator component might be a magnet 52 or a coil 54 rotatable with the tubular 34 and accordingly the second generator component would be the opposing coil 54 or magnet 52 stationary. For each energy generating tubular, the rotor comprises the first or second energizing portion and the stator comprises the other of the second and first energizing portions. The relative rotation of magnet 52 and coil 54 enables the pod 40 and the tubular 34 combination to generate power 50 as a result of the first generator component 52,54, rotatable with the tubular 34, and the second generator component 54,52 stationary relative to the first generator component. Relative movement of windings of the coil and magnetic field of the magnet induces current therein.

Generally, the first generator component is a first energizing portion driveably rotatable by rotation of the tubular and the second generator component is a second energizing portion supported concentrically about the first energizing portion and rotatable relative thereto. As the tubular rotates, the first energizing portion rotates relative to the second energizing portion and electrical current is generated from one of the first or second energizing portions. Referring to FIG. 3, generated electrical current is conditioned by the power conditioning components 56 for immediate use, or if the demand is less than the energy generated, surplus or excess energy can also be stored or buffered in the power storage components 58, and are capable of discharge when current is not being generated.

The power conditioning components 56 convert the current from the coil 54 into direct current within a suitable voltage range for the power storage components 58. Typical current characteristics for instrumentation might be 5 VDC at current of 4 to 20 mA. The power storage components 58 consists of standard elements including batteries, storage cells, capacitors or other technologies suitable for this purpose. The generator 50, and typically the stator, further comprises power conditioning components 56 or circuitry for rectification, such as a diode bridge, of the alternating current generated energy.

It is known to generate electrical current in challenging, harsh environments with components operating low rotational speed. Such generators implement magnets, coils, diode-type power conditioning and energy storage devices.

For example, in U.S. Pat. No. 5,828,135 issued to Barrett, a generator produces electricity through the relative motion of permanent magnets adjacent to stationary coils positioned about a railcar axle. In U.S. Pat. No. 4,539,497 issued to Boyer, a wheel-mounted generator is disclosed within a toroidal housing for mounting around a vehicle axle.

Implementing a robust generator, having large tolerances, in U.S. Pat. No. 5,584,561 issued to Lahos, a simple combination of two separate components; a magnet attached to the rotating wheel of a bicycle and a coil attached to the fixed bicycle frame. The alternating current from the coil is rectified and electrically connected to a series of light emitting diodes. In operation, Lahos' wheel-mounted magnet is repeatedly driven past the coil during rotation of the wheel. The magnet's magnetic field generates an alternating current in the coil which is fed to a diode bridge where the signal is rectified and fed to an electronic signaling device that produces electronic pulses to electroluminescent diodes. Electrical storage devices are provided for storing unused energy and ensuring continued lighting even if the wheel is not rotating.

Barrett, Boyer and Lahos are examples of robust, high tolerance versions of low-power generating devices. Barrett and Boyer are located on the physically challenging environment of vehicle and railway car axles and Lahos is located on the low-cycle, periodic incidence of magnet and coil of a bicycle generator.

In published application EP 2157278 A1 or US20110205847A1 to Lemenager, a hybrid apparatus is disclosed for collecting and transmitting data in a borehole between a downhole tool installation and a surface installation. The downhole tool installation is connected to the surface installation by means of a tubular conduit, such as a drill string or production tubing. The apparatus comprises an acoustic modem associated with each tool for converting electrical tool signals into acoustic signals. A hub forms part of the downhole installation and comprise an acoustic receiver and an electromagnetic transmitter. Downhole, digital tool signals are converted to analog acoustic signals, the acoustic tool signal passing along the downhole installation to be received at the acoustic receiver of an uphole hub. The received acoustic signals are used to operate an electromagnetic transmitter to transmit low frequency electromagnetic signals through the ground to the surface installation.

Pod Circuitry and Short Hop Data Communications

Figure 4:
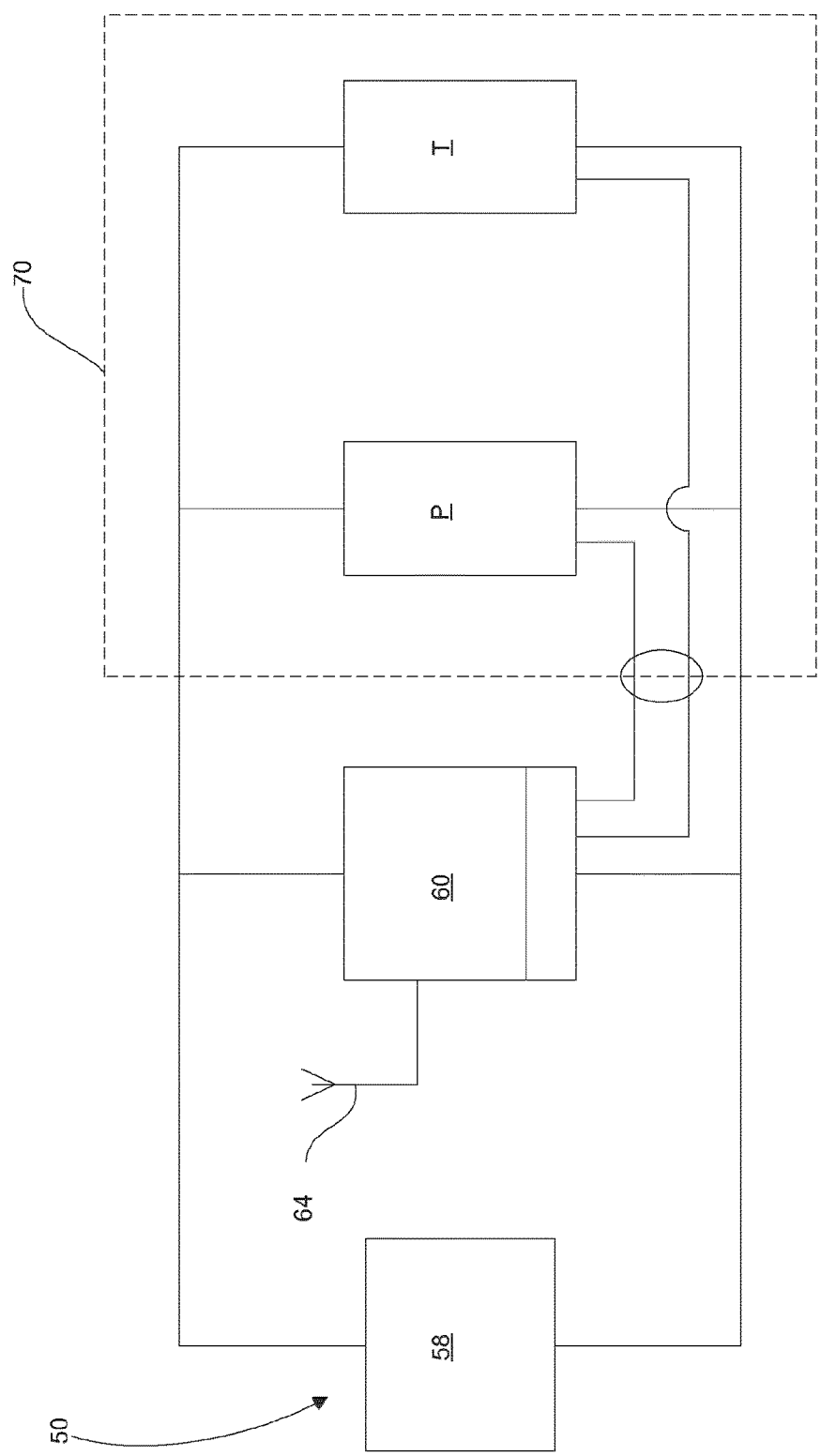
FIG. 4 is a schematic diagram of a data communications module for a pod and sensors connected thereto.

Referring to FIG. 4, each pod 40 is also fit with data communications transmitting and receiving circuitry such as that packaged a communications module 60 for facilitating short hop pod-to-pod communication. Data communication, common with wireless electronic communications, is bidirectional along the tubular string 24, for example: in the uphole direction to surface for delivery of sensor data or in the downhole direction from surface such as to deliver command signals for tool control or steering controls.

The communications module 60 is electrically connected and powered directly by the generator 50 or indirectly buffered through intermediate power storage components 58.

The communications module 60 can be of conventional design, power now being readily available from the pod 40. The communications module 60 typically comprises a microprocessor, memory, circuitry for interfacing to sensors, a transmitter and a receiver. Both the transmitter and receiver of module 60 are coupled electrically to an antenna 64, power conditioning circuitry 56 and the power source 58 receiving power generated by the pod 40. The communications module 60 of one pod 40 establish communication between like pods 40,40. The antenna 64 is located near an EM transparent window 124 as necessary.

Communication can include Ethernet communications or any other wireless bi-directional pod-to-pod communications including using one or more known hardware configurations and communication protocols. Short-range communication systems, such as near-field communications are typically in the MHz range and Bluetooth™, wireless local area network and Wi-Fi networks typically fall within the ultra high-frequency bands in the 2.4 GHz and higher ranges. The data communication module 60 provides short hop intercommunication between adjacent, or non-adjacent pods 40, depending on range. Ranges greater than the spacing of immediately adjacent pods 40,40 permits redundancy and bypassing of a failed pod 40. Pod failure can be managed by electronic reallocation from an adjacent pod 40 to a subsequent alternate pod 40 within transmission range.

System economics can be managed by optimizing transmission range for minimizing the number of pods required along the tubular string. Range is managed to ensure transmission integrity is maintained. Convenient spacing includes fitting every tubular 34, to every second tubular with a pod 40.

The pod 40 can comprise micro-controller and memory modules for data processing. Depending on the communication protocol used, the pod 40 can manage pod identity, wireless electronic data transmission and reception handshaking, and other protocols for maintaining data integrity and identification through a multiplicity of repeated transmission hops.

The pod 40 can further comprise sensors 70, such as a fluid pressure sensor P or a temperature sensor T, for monitoring downhole parameters representing downhole conditions. The outer component or stator, being adjacent the wellbore 22 and having a greater bulk in which to mount devices, is a convenient location within the pod 40 in which to mount the sensors 70.

The fluid pressure sensor P can be added to the pod 40, being powered by the power storage components 58 and interfaced with the communications module 60. With fluid pressure sensors P added to a series of pods 40,40, the operator can obtain a continuous view at surface 30 of a fluid pressure profile (FIG. 5B) along the entire wellbore 22, the profile being useful to enhance wellbore pressure management. In conventional drilling operations, the rig crew only has pressure measurements taken at surface, typically pressure measured inside the drill pipe and the casing pressure, if the well has been closed in. Typically the driller does not know what the pressure response is downhole until the effect reaches surface. Herein, with the ability to locate pressure sensors P in a plurality of pods, or every pod along the drill string, the drilling crew will have a complete pressure profile of the entire well, in real time. For example, in the instance of a gas kick, a pressure profile allows the crew to watch as the gas kick is travelling to surface so that they can prepare accordingly. This adds significantly to safety on a drilling rig.

Similarly, temperature sensors T can be added to a pod 40 or all pods. Again sensors 70 are powered directly from the generator 50 or through the power storage components 58 and interfaced with the communications module 60. With temperature sensors T added to the pods 40, the operator can also obtain a continuous view of the temperature profile (FIG. 5C) along the entire wellbore 22. Temperature changes can be indicative of locations of increased friction or possible equipment failures. Localized temperature changes in the wellbore can also indicate inflow of warm formation fluid. This is important information for the operator or drilling crew in order to manage the pressure balance and the chemical composition of the drilling fluid. Temperature change can also indicate a loss of drilling fluid to the formation which is important for maintaining well control and possibly preventing lost circulation problems.

Depending on the economics and downhole operation, one or more sensors 70 could be added to one or more of the pods 40, the pod 40 being fit with appropriate sensor circuitry.

Referring to FIGS. 5A, 5B and 5C, an example downhole system has the pressure sensors P at locations 1, 2, 4, 5, 8, 9 and 10 as well as the temperatures sensors T at locations 2, 3, 5, 6, 7, 8 and 10. As shown in FIG. 5B, a pressure profile for the downhole system would have data points at locations 1, 2, 4, 5, 8, 9 and 10 while in FIG. 5C, a temperature profile for the downhole system 100 would have data points at locations 2, 3, 5, 6, 7, 8 and 10.

Suitable sensors for downhole use include model TMP35 and TMP36 temperatures sensors T from Analog Devices, Inc. of Norwood, MA and model PPS03 pressure sensors P from Phoenix Sensors LLC of Tempe, AZ The TMP35/TMP36 sensors are low voltage, precision centigrade temperature sensors, providing a voltage output that is linearly proportional to the Celsius (centigrade) temperature. The PPS03 is a miniature MEMS piezo-resistive pressure sensor suitable for high temperature applications.

Accordingly, a system incorporating wireless communication along the pods 40 comprises the one or more sensors 70 for establishing data signals related to downhole parameters, the communication modules 60,60 . . . communicating the sensor data uphole to surface 30 along the plurality of pods 40 to surface 30.

In embodiments in which the tubular string 24 is a drill string having a steerable drill bit 26 at a downhole distal end 32, the communication modules 60 communicate control signals downhole along the plurality of pods 40 from surface 30 to the steerable drill bit 26 downhole. The pods 40 can include sensors 70 which include drill bit guidance sensors, data from the guidance sensors being communicated pod-to-pod to surface 30 for drilling analysis and establishing control signals for controlling the steerable drill bit 26.

Because communication between pods 40,40 can be conducted at high data rates, the drilling crew can to view the detailed logging information of the surface and downhole parameters, from the "logging-while-drilling" tools, in real time. This allows the drillers to adjust the well path to the most desirable direction based on logging data.

Pods Incorporated in Centralizers

The pods 40 are fit to the tubulars. Pods can be provided as independent tools in addition to other tubular equipment or incorporated into standardized equipment already employed along the tubular string 24.

One piece of equipment common for use in deviated wells is a centralizer. Centralizers 100 are known in the oil and gas industry for spacing tubulars 34, drill pipes, rod strings and the like, from the side walls of wellbores 22 so as to minimize wear between the tubular 34 and the walls.

Centralizers for drill pipes are particularly useful during drilling of horizontal wells because the rig and drilling operation puts a lot of axial downward force on the drill string, causing it to buckle in the hole. The impact on the tubulars is particularly evident in the rotary steering drilling operations where the drill string is rotating all the time. Wear on the radially distended drill pipe tool joints is known and has been mitigated by applying hard facing to the tool joint. However, when drill pipe in compression buckles in the well, severe wear occurs along the smaller diameter middle of the tubular. Centralizers help to significantly reduce this wear problem.

On horizontal legs of extended wellbores 22, the tubular string 24 invariably lays on the lower wall. Without a centralizer, the wellbore or the tubular can wear significantly. In normal operations, drill pipe centralizers are run provided as a matter of course so as to centralize and reduce wear of the drill pipe and casing. Accordingly, incorporating a pod 40 within a centralizer is a marginal capital expense but is not in increase in cost as far as installation and rig time is concerned.

Figure 6:
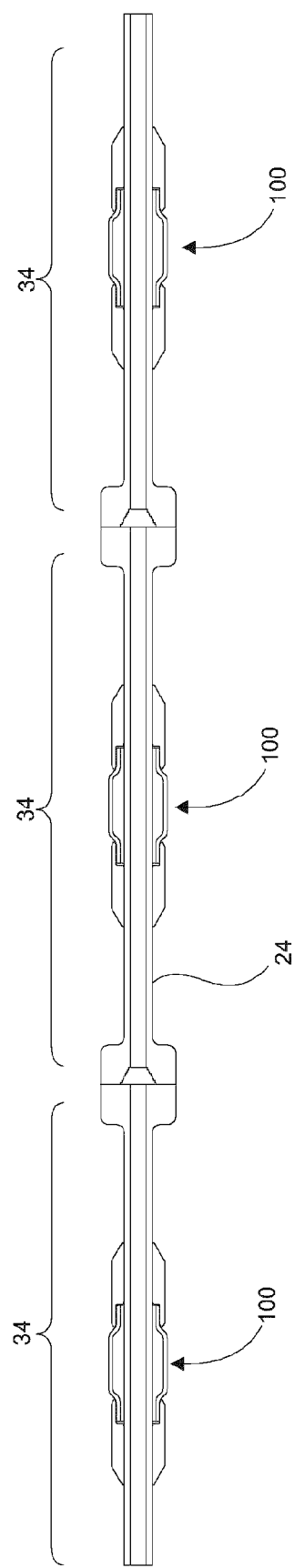
FIG. 6 is a side view of a portion of a tubular string comprising three joints of tubular drill pipe, each pipe fit with a pod incorporated into a centralizer.

Generally, the centralizer 100 engages the tubular 34 and acts to space the tubular 34 from either the walls of the earth of the wellbore 22 or from casing of a cased wellbore. Conventional casing centralizers are generally one piece and slide axially over the casing. As shown in FIG. 6, tubulars 34, such as drill pipe, have upset tool ends at both box and pins ends that are larger than the intermediate tubular portion and one cannot install a centralizer thereon from any end. A centralizer must be clamped about the intermediate portion of the tubular and secured thereon.

A suitable centralizer, permitting relative rotation between the centralizing portion and the rotating tubular 34 is as set forth in Applicant's own Published PCT Application PCT/CA2013/050919 published Jun. 5, 2015, Published US Application US2015/0300100A1 on Oct. 22, 2015 and granted as US100000978B2 on Jun. 19, 2018.

Use of Applicant's mixed form centralizers, as disclosed in U.S. Pat. No. 10,100,588 B2 issued Oct. 16, 2018, provides a rugged and durable centralizer that can also survive in an open hole, recently drilled and not yet cased, portion of the wellbore. Other conventional centralizers are made of plastics, intended to centralizing in casing, and are not as rugged. As shown in FIG. 2B, such as rugged centralizer can comprises a resilient inner sleeve having three or more protruding members extending radially outwardly from an outer surface of the inner sleeve. The inner sleeve receives the tubular and rotatably spaces the tubular from the wellbore. The centralizer further has an outer rigid support body for receiving the outer surface of inner sleeve and can rigid and hardened protrusions and resilient protrusions that typically extend through the outer support body from the inner sleeve, and combinations thereof. The hardened protrusions are radially inward of the resilient protrusions and can act as a minimum centralizing radius should the resilient protrusions wear down.

The pods 40, providing energy generation, can be incorporated in the centralizers 100. Pods 40 resolve power concerns for downhole components, and housing the pods 40 in centralizers 100, that may already in use, can be relatively inexpensive. Further, it is now possible to retrofit each of a plurality of sections of tubular 34,34 into power generating and data transmitting downhole locations, resulting in short, and energetically powered, communication hops from centralizer-equipped pod 40 to centralizer-equipped pod 40.

Centralizers incorporating pods 40 serve multiple functions including as a communication relay or repeater and as a centralizer to provide casing, wellbore and tubular wear protection.

Referring to FIG. 6, shown on a portion of a tubular string 24, a practical application of short hop communication is now made available as each pod 40, of many pods 40,40, 40 . . . are self-powered for data transmission to subsequent pods 40, all the way to surface 30 for filing, for review or for guiding downhole operations. On-board, permanent magnet generators 50 eliminate the prior art, frequent battery replacement, as the pods 40 generate their own power as soon as the tubular 24 rotates. The pods 40 remain on the tubular 34 along the entire wellbore 22 for data collection and review without minimal or no servicing other than if the centralizing portion becomes excessively worn.

Figure 7B:
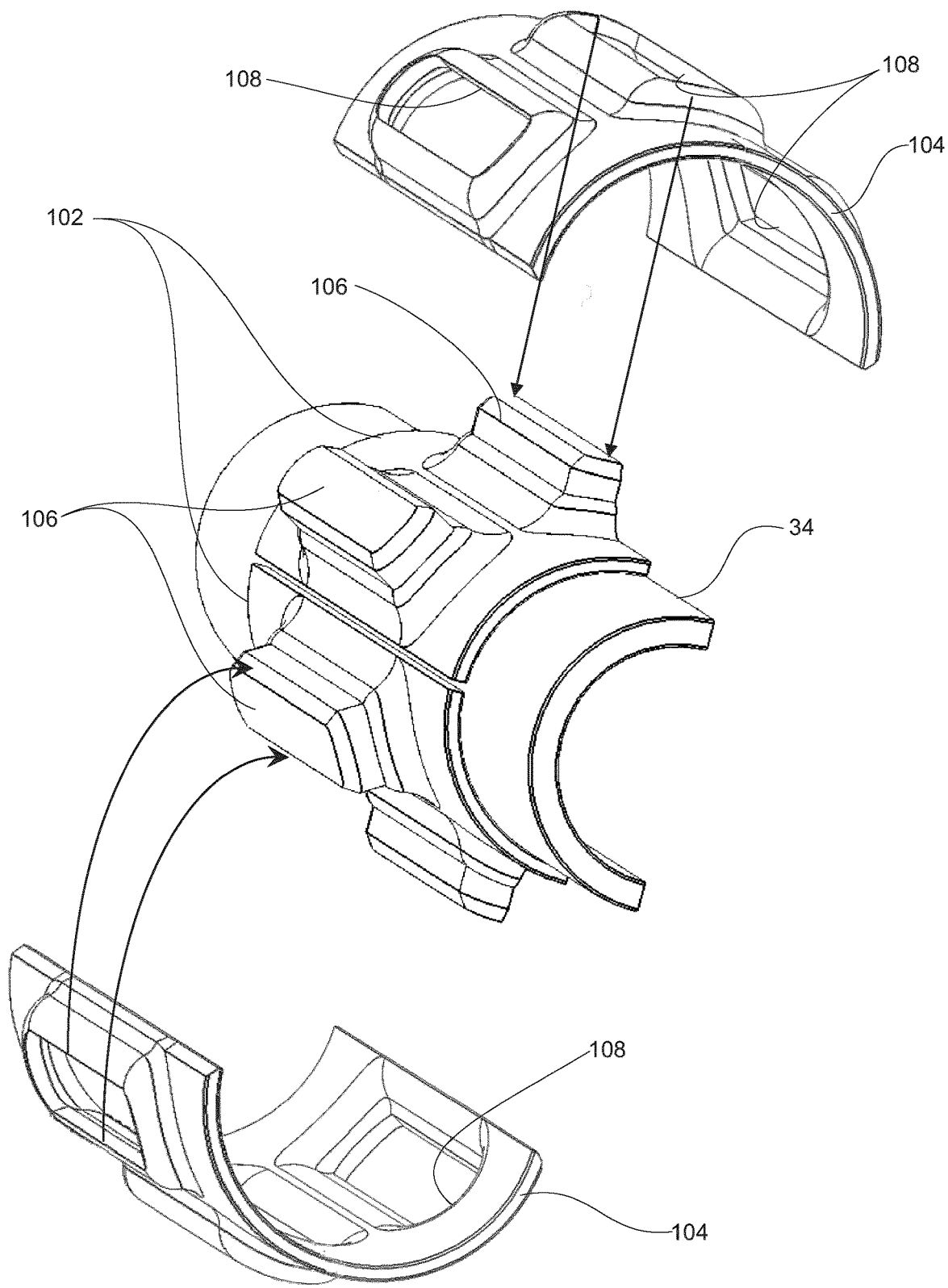
FIG. 7B is an exploded perspective view of the centralizer of FIG. 7A illustrating a half section of the tubular and discontinuous inner sleeves and a pair of outer shells for retaining the entire circumference of the inner sleeves to the tubular, the sectional centralizer enabling intermediate installation of the centralizer to a joint of tubular string.

Referring to FIGS. 7A and 7B, a multi-part, clamshell form of centralizer 100 can be robustly secured about an intermediate portion of the tubular 34 without axial access to a tubing pin end. As the tubular 34 rotates, the centralizing portion engages the wellbore 22 and remains stationary relative to the wellbore 22 and the tubular 34.

The centralizer 100 comprises a centralizing portion having a resilient inner sleeve 102 having a bore for receiving the tubular 34 rotatably therein and an outer body 104 for protecting and retaining the inner sleeve 102 to the tubular 34. The tubular outer body 104, sandwiches the inner sleeve 102 between the body and the tubular 34.

As shown, protrusions 106 of the inner sleeve 102 can protrude through ports 108 of the outer body 104 to engage the wellbore 22 and space the tubular therefrom. Alternately, as shown in FIG. 2B, the outer body 104 also has non-resilient protrusions 107. The outer shell protrusions 107 can be further hardened for maintaining centralizer function and integrity should the more resilient protrusions 106 wear down.

At least the outer body 104 has axially-extending arcuate end portions. The centralizer 100 further comprises a pair of annular end collars 110 for overlying and retaining the end portions of the outer body 104 and the inner sleeve 102 there beneath. The collars 110,110 restrain the inner sleeve and outer body in both in the radial direction about the tubular 34 and axially therealong. Axial restraint of the centralizing portion also cooperates with integrating the generator 50 by axially aligning, and maintaining alignment of the first and second generating portions 52,54.

Figure 8:
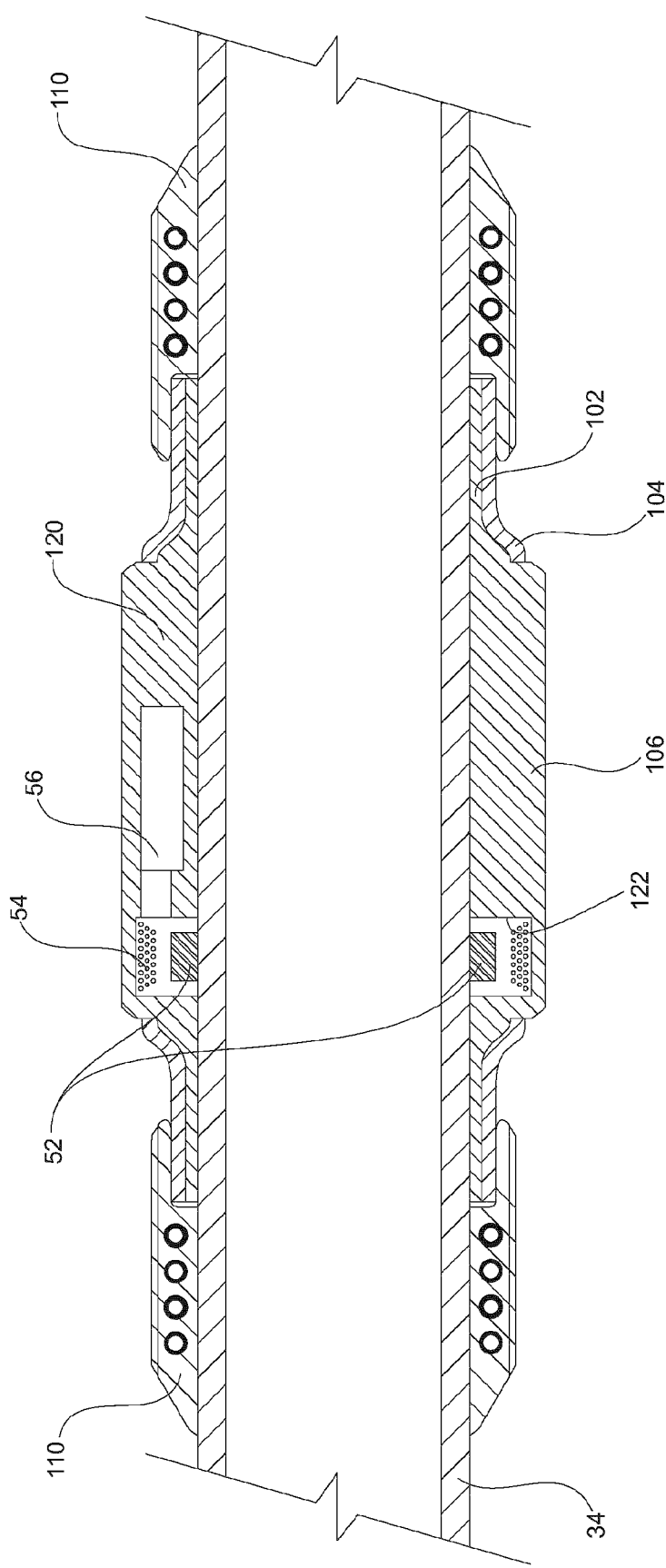
FIG. 8 is a side cross-sectional view of the centralizer of FIGS. 7A and 7B, illustrating magnets affixed circumferentially about the tubular, and one more coils fit at least to the inner sleeve and circumferentially thereabout, the inner sleeve having an annular pathway thereabout aligned axially by the end collars so as to align with the magnets so as to enable relative rotation therebetween with the magnets passing in an energizing manner adjacent the coils.
Figure 9:
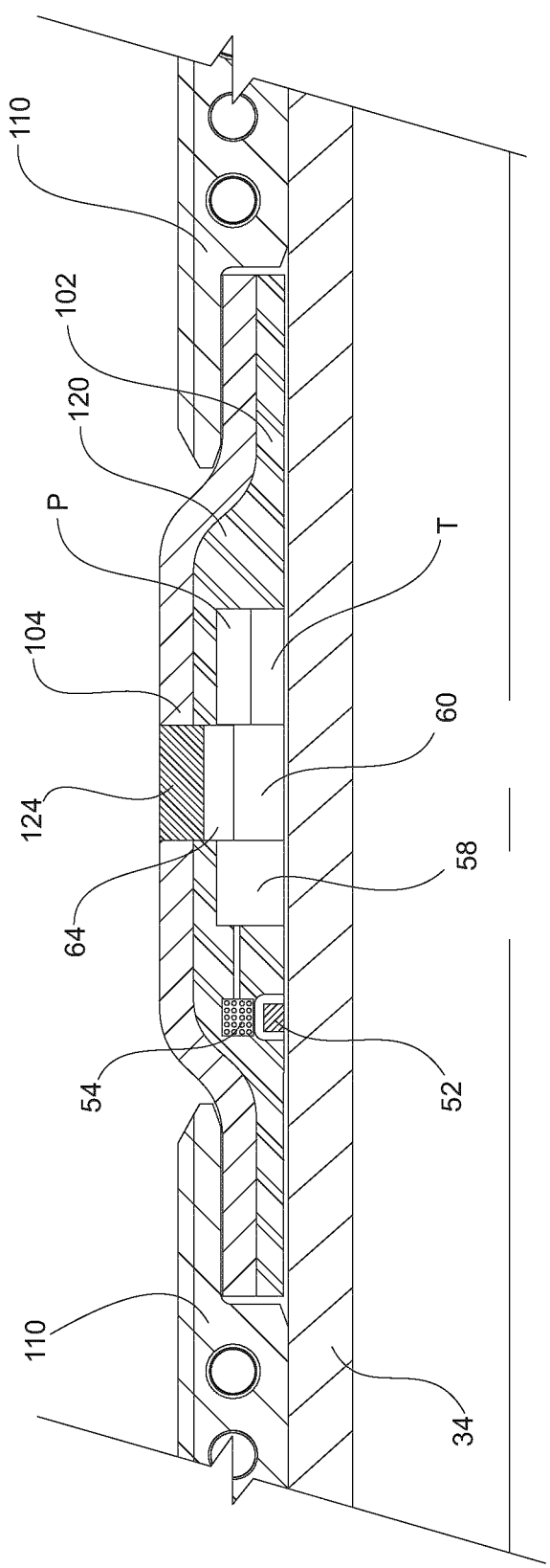
FIG. 9 is a side cross-sectional view of the centralizer of FIG. 7A illustrating arrangement of data and electronic communications module and sensors housed therein.

Referring to FIGS. 8 and 9, the centralizer 100 typically comprises three or more protrusions 106 extending radially through the ports 108 of the outer body 104 so as to resiliently engage the wellbore 104, spacing the tubular 34 from the side wall of the wellbore 22, be it casing or open hole.

Centralizer 100 resilient protrusions 106 frictionally engage the wellbore 22 and remain rotationally fixed or stationary relative to the tubular 34 rotating within. If the resilient protrusions wear down, the rigid or hardened protrusions 107 can engage and centralize the tubular 34 in the wellbore 22.

The protrusions 106 also form an enlarged annular volume 120 providing more significant real estate within which to house components of the generator 50 including some or all of a coil 54, the power conditioning components 56, the power storage components 58, the communications module 60 and the sensors 70.

The annular volume 120 can be rendered hollow at points about the circumference for locating components within, as shown in FIGS. 8 and 9, or remain as solid material of the inner sleeve 102. The annular volume 120 can be formed or machined to form a hollow cavity to house the components.

In embodiments, the relatively large annular volume 120 of the inner sleeve, and which may include some of the outer shell 104, is used to house components including a coil or coils 54 of the generator 50, in part due to the advantage of using a coil of larger physical size. Accordingly, at an axial location along the inner sleeve 102, for accommodating whichever of the generator first and second generator components, the inner sleeve 102 is formed with a radially inward annular groove 122. The groove 122 permits upstanding mounting of one component on the outer diameter of the tubular yet permitting relative circumferential rotation of the first generator component 52,54 and the second generator component 54,52. At greater expense and time expended, the surface of a tubular 34 could be custom modified to retrofit to radially recess the first or second generator components wholly or partially therein.

Referring to FIG. 9, the first component magnet 52 is attached to the outer surface of the tubular 34 within the annular area 120. The second component coil 54 is attached to the inner surface of an annular groove 122 in radial alignment with the first component magnet 52. The power storage components 58 as well as the power conditioning components 56 may also be attached to the inner surface of the inner sleeve 102 within the annular area 120 and attached to the second component coil 54.

A first generator component, being a magnet 52 in this instance, is mounted to the tubular, the magnet 52 rotates circumferentially with the tubular 34 and relative to the second generator component, being a coil 54, mounted within the annular volume 120 of the resilient protrusions 106 or non-resilient protrusions 107, or both. Rotation of the tubular 34 passes the coil 54 repeated past the magnet field of the magnet 52 and electrical current is produced within the coil 54. The energy is directed to the power conditioning components 56 and energy that is not immediate consumed by equipment may be stored in the power storage components 58.

In several embodiments related to affixing rotor magnets 52 to the tubular, and referring to FIGS. 11A and 11B, the rotor magnet 52 can be self-magnetically affixed to the tubular 34, individually or in multiples, or being one or more magnets attached to an attachment strip 130 as in FIGS. 12A and 12B for secure attachment, spacing of multiple magnets or both. The magnets in the attachment strip 130 being separated by non-magnetic spacers 132. The magnets can be affixed in a variety of manners including self-secured magnetically, or by adhesive or double-sided tape, or using mechanical fasteners.

Further, and referring again to FIG. 9, the communications module 60 is attached to the inner sleeve 102 within the annular volume 120 and connected to the power storage components 58. The antenna 64 can also attached to the inner sleeve 102 within the annular area 120 and connected to the communications module 60. In the case of an outer body 104 formed of metal, an EM transparent window 124 can be included to maximize communication range and minimize interference.

Conventional wireless signal strength is traditionally measured in Decibel-milliwatt (dBm), being a power ratio expressed in decibels (dB) with reference to one milliwatt (mW). For example, zero dBm equals 1 milliwatt (mW) of power, and −10 dBm equates to 0.1 mW, and −20 dBm equates to 0.01 mW and so on. Signal strength in the order of −65 dBm is a minimum for basic data packet transmission and −60 dBm for video. High signal strength (lower negative numbers) requires greater power and when powered exclusively by battery, power must be conserved and low signal strength is applied. One understands that, for pods 40 operating inside steel wellbore casing and along steel tubulars, stronger signs are required. Herein, due to the on-board generators 50 for each pod 40, battery conservation is no longer a constraint and communication signal strength can be made much stronger because the generator 50 is delivering power and re-charging the onboard storage battery or capacitor at all times. This is an advantage over the prior art batteries-only tools that discharge quickly if a lot of power is drawn.

The circuitry in the communications module 60 is hardened to accommodate shock, fluid pressure and temperature conditions. All components preferably operate at temperatures at or above about 105° C. Data processing speed and communications bandwidth may be reduced due to lower operating frequencies applied to counteract the effect of higher temperatures.

The fluid pressure sensor P can also be added to the centralizer 100, drawing power from the power storage components 58 and interfaced with the communications module 60. Any fluid sensor suitable for use in downhole wellbore applications that fits in the annular area 120 can be used. The temperature sensor T can be added to the centralizer 100, drawing power from the power storage components 58 and interfaced with the communications module 60. Any temperature sensor suitable for use in downhole wellbore applications that fits in the annular area 120 can be used.

Optional Embodiments

A system of data collection and recovery can use any combination of pressure and temperature sensors P,T located on centralizers 100 at various locations downhole to get customized readings for each application. Where operating conditions do not allow for all desired sensors to run at a specified sampling rate, either the number of sensor downhole locations or the sampling rate can be adjusted.

Various forms of centralizer 100 can be provided to accommodate other sensors 70 typically used in downhole applications, the centralizer being designed or modified for a particular sensor or the sensor configuration being adjusted to fit in the centralizer's annular area 120. The sensors 70 are selected so as to be compatible or otherwise operate under the constraints of the onboard, generated power provided by the generator 50, or power storage components 58, and produced signals capable of electric or electronic interface with the communication module 60.

Typically the tubular string is a drill string comprising a plurality of tubulars 34 or 30 foot long joints of drill pipe connected together. Some or all of the tubulars 34 are fit with pods 40. For data communication, the pods 40 could be spaced at regular intervals, such as on each 30 foot tubular. Depending on the wireless range, and acknowledging that drilling rigs often run in and trip out using triple stands of pipe 34,34,34, each triple stand might be fit with one pod 40, or one pod every 90 feet.

The tubular 34 can be fit with a pod-equipped centralizer 100 before commencing drilling, before running in the wellbore 22. Conveniently, and without delay, expense and time pressures associated with installation during the drilling process, the centralizer 100 can be fit to the tubular 34 stated on a pipe rack such as a horizontal pipe rack before lifting into the rig racks. Like other centralizers, the centralizer 100 is preferably installed in the middle of the tubular 34. When a triple stand of tubulars 34,34,34 is pulled from the vertical rig rack for coupling with the tubular string 24 at the rig floor, the middle of the joint is less readily accessible.

However, once running-drilling and tripping is in process, a preferred location becomes accessible at the rig floor, but would require a short delay while a crew installed a new or replacement pod 40 the centralizer 100 over the rotary table. The ability to remove and install the centralizer 100 without access to the end of the tubular 34 facilitates the replacement of pods 40.

The pod 40, incorporates into a centralizer 100 for pipe centralization is also enough to survive the rigors of handling and running into the wellbore sections of the tubular 34 in the rig. As a result, the centralizer 100 is suitable for processes including installation before or as the tubular 34 going in hole, run in, rotate, drill, generator 50 power as soon as the tubular 34 is rotated in hole, and commences establishes real time data communication between tubulars 34 and communications receivers and data terminals 42 at the surface 30.

As a result of the combination disclosed above, a new system and apparatus provides the following advantages: low cost data communication pods acting as repeaters along the tubular string. Pods can be conveniently incorporated in centralizers 100 that are often present or even required in rotating string operations. Power generation downhole at a standard tubular 34, such as drill pipe without a custom pod housing or sub; advantageously uses the tubular 34 as the rotating rotor portion of a generator 50. As rotary steerable systems are becoming more common, characterized by tubular string 24 rotation substantially all the time, rather than alternating non-rotating sliding for steering and rotation for straight drilling. Continuous rotation of the tubular string means that power can be generated substantially continuously while drilling. Where the pod 40 is incorporated in a centralizer 100, a modular design having a splitable inner sleeve 102 and outer body 104 enables ease of installation at any time, including after tubulars are assembled into a double or triple stand. The centralizer 100 pod 40 can be installed off-line, such as on the pipe racks, if required or desired.

Further, the pods' 40 repeater frequency can now be the epitome of "short hop" being as short as each joint of tubular 34, in the order of 30 feet, with minimal power generation requirements are each pod, short transmission distance and reduced sophistication and reduced expense associated therewith. Now, if used at all, a rechargeable power cell can have a minimal storage capacity, unlike the large capacity of the large capacity once-use-until exhausted batteries of the prior art.

Indeed, with continuous tubular rotation, the pod 40 need not be coupled with a rechargeable or backup power storage, battery or capacitor at all.

The pod-equipped centralizer 100 is modular, and can be adapted to any diameter used on any standard tubular 34. The centralizer 100 is portable and transferable, mobilized on short notice, can be fit to any length tubular string 24 and distance between repeaters can be varied as required. The communication modules 60 can communicate, in both uphole and downhole directions, at high data rates with high-power, short-hop EM communication.

Further, use of pods 40 in drill pipe centralizers provides feedback on drilling performance and wellbore risks, adding to the known improvements to horizontal drilling using centralizers. Use of centralizers enables an increase in the amount of axial force that can be applied to the drill pipe while preventing buckling of the drill pipe, enabling increased weight on bit (WOB), higher penetration rates and reduced overall drilling cost.

Figure 10A:
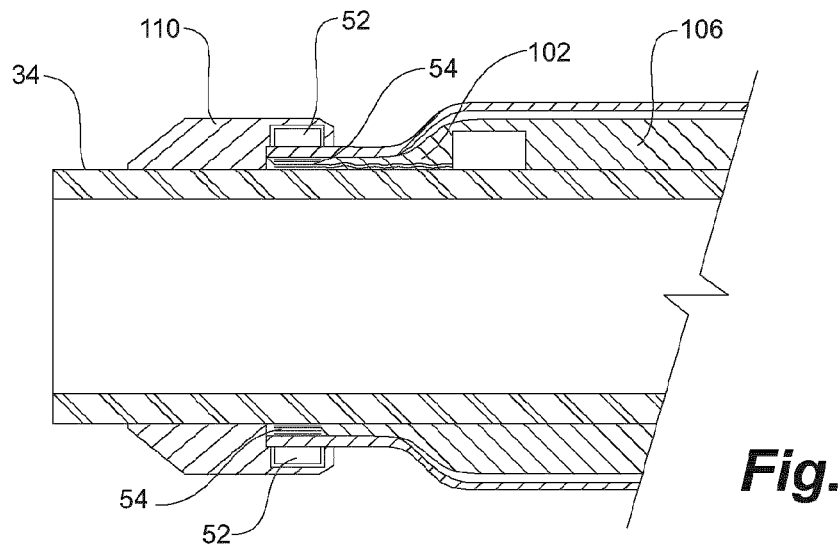
FIGS. 10A, 10B and 10C are side cross-sectional views illustrating examples of optional locations for first and second energizing components of the generator in a centralizer, namely alternate locations for magnet and coils. More particularly.
Figure 10B:
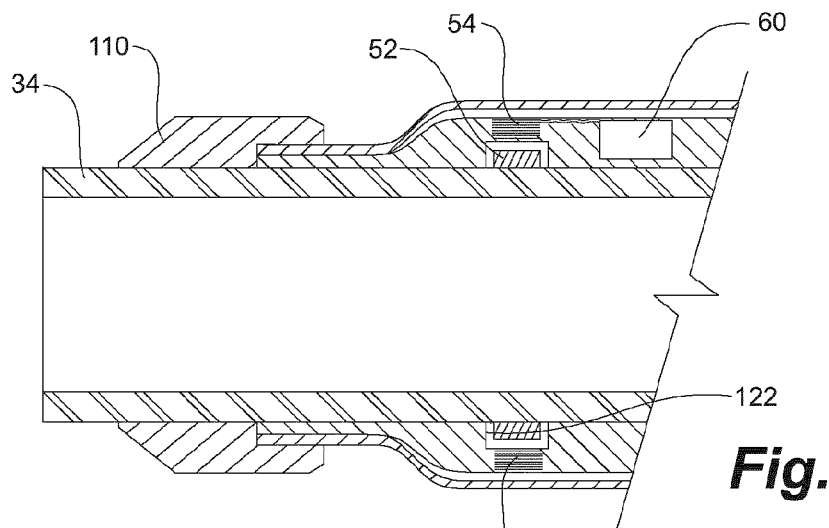
Figure 10C:
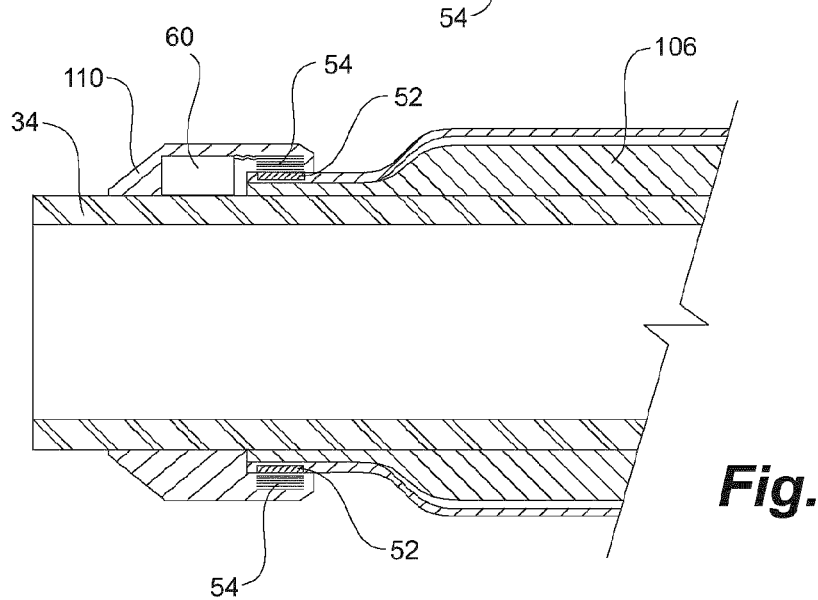

Referring to FIGS. 10A, 10B and 10C, the locations of the first and second energizing components of the generator 50 in a centralizer 100 may be varied. As shown in FIG. 10A, one or more coils, of narrow radial extent are located in one or both of the sleeve ends, under the axially restraining collars 110 affixed to the rotatable tubular 34. The magnets 52 are correspondingly and radially juxtaposed in the co-rotating collars 110 for axial alignment with the sleeve's coils 54.

FIG. 10B illustrates an alternative embodiment having one or more coils 42 of more substantial radial extent, than that of FIG. 10A, being located in the greater bulk of the annular volume 120 of the inner sleeve 102, the magnets 52 being juxtapose and affixed to the tubular 34 for axial alignment with the sleeve's coils. The magnets 52 rotate freely with the tubular 34 within a chase or the annular groove 122 formed in the inner sleeve 102.

In yet another embodiment, shown in FIG. 10C, one or more coils 54, of narrow radial extent, are located in the axially-restraining end collars 110 affixed to the rotatable tubular 34, the magnets 52 being correspondingly juxtaposed in the non-rotating inner sleeve 102 for axial alignment with the collar's coils 54.

The embodiments of the invention for which an exclusive property or privilege is claimed are defined as follows:

1. An energy generator apparatus for a rotatable tubular having an outer surface defining an outer diameter of the rotatable tubular and extending downhole along a wellbore comprising:

a tubular sleeve mounted over the rotatable tubular, the tubular sleeve comprising a first clamshell portion and a second clamshell portion and end collars overlying and retaining opposing ends of the tubular sleeve, the tubular sleeve having an inner surface defining an inner annular groove;

a first energizing portion mounted on the outer surface of the rotatable tubular and received in the inner annular groove of the tubular sleeve, the first energizing portion being drivably rotatable by rotation of the rotatable tubular; and a second energizing portion attached to the tubular sleeve within the inner annular groove of the tubular sleeve, the second energizing portion being supported concentrically about the first energizing portion and rotatable relative thereto; and wherein, when the rotatable tubular rotates the first energizing portion rotates relative to the second energizing portion, electrical current is generated from one of the first or second energizing portions.

2. The energy generator apparatus of claim 1, wherein: one of the first or second energizing portions being a magnet for producing a magnetic field, and the other of the second and first energizing portion comprises an electrical coil, relative movement of the coil and magnetic field inducing current therein.

3. The energy generator apparatus of claim 1 further comprising a wireless data transmitter for communication of data signals between generators.

4. The energy generator apparatus of claim 1, wherein the rotatable tubular and the first energizing portion form a rotor having an axis and the tubular sleeve and the second energizing portion form a stator concentric with the rotor and rotatable about the rotor's axis.

5. The energy generator apparatus of claim 4 wherein the stator further comprises circuitry for rectification of the generated energy.

6. The energy generator apparatus of claim 5 wherein the rectification circuitry comprises a diode bridge.

7. The energy generator apparatus of claim 4 wherein the stator further comprises one or more sensors, each sensor for establishing data signals related to downhole parameters.

8. The energy generator apparatus of claim 7 wherein the one or more sensors are pressure or temperature sensors.

9. The energy generator apparatus of claim 7 wherein the stator further comprises a wireless data transmitter for transmitting the data signals related to downhole parameters and a wireless data receiver for receiving further data signals.

10. The energy generator apparatus of claim 9 wherein the wireless data transmitter and the wireless data receiver are configured for radio frequency wireless communications.

11. The energy generator apparatus of claim 1 wherein: the first energizing portion comprises one or more magnets arranged about an axis of the rotatable tubular; and the second energizing portion comprises one or more coils; wherein
as the rotatable tubular rotates, the one or more magnets are repeatedly driven past the one or more coils for generating an alternating current therein.

12. The energy generator apparatus of claim 1, wherein the tubular sleeve comprises a tubular centralizer for engaging the and being rotationally restrained by the wellbore.

13. The energy generator apparatus of claim 1 further comprising an energy storage device for storing surplus energy during generation of the current and capable of discharge when current is not being generated.

14. A system for wireless communication along a tubular string of tubulars between surface and downhole locations comprising:
- a plurality of energy generator apparatuses according to claim 1 and distributed along the tubular string; and
- a radio frequency wireless data communication module having a transmitter and receiver, at each generator apparatus, the communication module powered by its respective generator apparatus;
- wherein, as the tubular string rotates, each communication module communicates with a like communication module within a wireless range.

15. The system for wireless communication of claim 14 wherein each generator apparatus and associated communication module are incorporated in a respective tubular centralizer pod.

16. The system for wireless communication of claim 15 wherein each centralizer pod further comprises one or more sensors for establishing data signals related to downhole parameters, the communication modules communicating the sensor data uphole to surface along the plurality of centralizer pods to surface.

17. The system for wireless communication of claim 15 wherein the tubular string is a drill string having a steerable drill bit at a downhole distal end, wherein the communication modules communicate control signals downhole along the plurality of centralizer pods from surface to the steerable drill bit downhole.

18. The system of claim 17 wherein the sensors are pressure or temperature sensors.

19. The system of claim 18 wherein the sensors are guidance sensors.

* * * * *